J. Merrill,
Cask.
N°59,622. Patented Nov. 13, 1866.
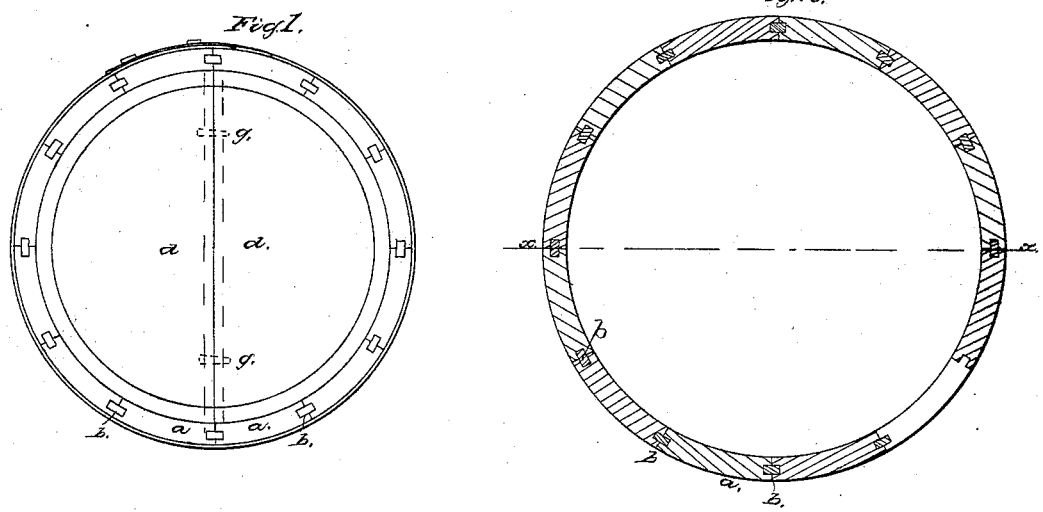
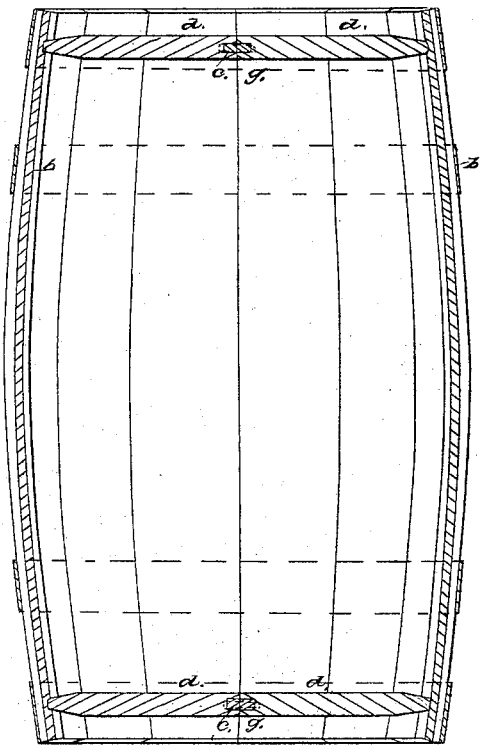
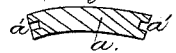
Witnesses:
Inventor.
Joshua Merrill

UNITED STATES PATENT OFFICE.

JOSHUA MERRILL, OF BOSTON, MASSACHUSETTS.

IMPROVEMENT IN CASKS, BARRELS, &c.

Specification forming part of Letters Patent No. 59,622, dated November 13, 1866.

*To all whom it may concern:*

Be it known that I, JOSHUA MERRILL, of the city of Boston, in the county of Suffolk and State of Massachusetts, have invented certain new and useful Improvements in Casks, Barrels, and Kegs suitable for holding and transporting liquids; and I do hereby declare that the following is a full and correct description thereof, reference being had to the annexed drawings, making a part of the specification, and to the letters of reference thereon.

My said invention is applicable to casks that have been made with plain or straight joints, as well as new casks, and a great part of its utility is due to the fact that old casks can be rejointed in the manner herein described, and made more secure without requiring new staves or being reduced in size.

My invention consists, first, in an improved cask, barrel, or keg, having its joints made by grooves in the stave-joints, which match each other when the staves are set up, and a separate tongue or key-piece, which is of the shape and nearly of the size of the hole made by bringing the matched grooves of the stave-joints together, but a little larger, and is driven into the grooves of both staves, forming a joint similar to a tongue-and-groove joint; second, in combining the joints of a cask, so jointed with matched grooves and a tongue or key-strip with glue or other suitable gelatinous cement to resist petroleum, alcohol, and similar liquids that do not dissolve glue; third, in combining with the joints of a cask, barrel, or keg formed with matched grooves in the staves, and a separate tongue or key-piece, a cement of shellac or rosin, or other suitable resinous cement, to resist leakage of beer, molasses, or other watery liquids; but more particularly to describe my invention, I will refer to the drawings annexed, of which—

Figure 1 is a top view of the cask; Fig. 2, a cross-section; Fig. 3, a vertical section through the heads and staves; Fig. 4, a section of a stave.

The staves $a$ are each made with one or more grooves, $a'$, at each joint, the groove or grooves in each joint of the stave being at the same distance from the outside of the stave, so as to match the grooves when the staves are set up.

Separate tongues or key-strips, $b$, shown in section at Fig. 2, are driven down into the holes made by bringing the matched grooves together, or may be driven into the groove of one of the staves before setting up, and then the staves set up the same as my patent tongue-and-groove-jointed cask, patented May 29, 1866. The heads $d$ are also jointed by matched grooves, and a key-piece or separate tongue, $c$, driven in.

Dowel-pins $g$ may be used in putting the head-pieces together.

The grooves and tongue-pieces may be of the shape shown in the drawings, or may be semicircular, requiring a round rod to be driven in to pack the joint.

The principal advantage of this joint is, that an old cask may be taken to pieces and jointed in this manner, and be made tight without reducing its size or putting in new staves; but a new cask can be made without cutting away so much of the staves as by a tongue-and-groove joint or a lapped joint.

Although the joints thus made are comparatively secure from danger of leakage, yet I prefer to cement them with glue or other similar gelatinous cement when the casks are to contain petroleum, alcohol, or other similar fluids that do not dissolve glue, and with shellac or rosin, or other similar resinous cements, when the casks are to contain beer or other watery fluids.

The glue is to be applied hot to the joints by dipping, or with a brush before the staves are set up, and to the tongue-pieces before they are driven into the grooves.

The shellac or rosin is also applied to the joints in solution by dipping, or by a brush, before the cask is set up, and to the tongues and key-pieces before they are driven into the grooves.

The staves and head-joints may be grooved with a plow or grooving-plane, or by machinery. The casks may be made in the usual manner and plain-jointed, then trussed and bent by the fire before the grooves are cut; or the grooves may be cut directly after plain-jointing; or the staves may be bent by rollers after being steamed and plain-jointed by machinery, as practiced in large cooperages.

In making the shellac solution, I prefer to mix together, in about equal proportions, alcohol, ninety-five per cent., and coal-tar, naphtha, or benzole, of about 32° Baumé's hydrometer, and to one pint of this mixture I put in a pound or a pound and a half of common gumshellac. This makes a good thick varnish, and does not dry so rapidly as shellac dissolved in alcohol alone, thus giving more time to set up the cask after the cement is applied to the joints. Shellac will, however, answer if dissolved in alcohol alone or in caustic ammonia. Rosin cement may be made by dissolving in a pint of common naphtha one and a half pound of the rosin of commerce, or gum-dammar will answer as well.

The casks made as above described may be coated inside by a coating of glue or shellac, according to the liquid the cask is designed for. The coating of the inside is well known and not necessary to be described, except to say that it may readily be done with glue by pouring into the cask a few gallons of hot glue solution, and then by putting in the bung tight and rolling the cask about. The air within, being heated by the hot glue, forces it into the pores of the interior surface of the heads and staves.

I claim as of my invention and improvement in casks, barrels, and kegs—

1. The improved cask, substantially as described, having its joints made by matched grooves in the staves, and a separate tongue or key-strip of wood driven in to fill the said matched grooves, substantially in the way and for the purposes described.

2. In combination with the joints of a cask made with matched grooved joints and a separate tongue or key-strip, a coating or stuffing of glue or similar gelatinous cement between the members of said joints, applied substantially in the way and for the purposes described.

3. In combination with the joints of a cask made with matched grooved joints and a separate tongue or key-strip, a coating or stuffing of shellac, rosin, or other similar resinous cement between the members of said joint, applied substantially in the way and for the purposes described.

JOSHUA MERRILL.

Witnesses:
 THEODORE M. PLIMPTON,
 GEORGE H. FOSTER.